United States Patent
Ifuku et al.

(10) Patent No.: US 12,037,246 B2
(45) Date of Patent: Jul. 16, 2024

(54) METHOD FOR DETECTING ABNORMAL GROWTH OF GRAPHENE, MEASUREMENT APPARATUS, AND FILM FORMATION SYSTEM

(71) Applicant: Tokyo Electron Limited, Tokyo (JP)

(72) Inventors: Ryota Ifuku, Nirasaki (JP); Takashi Matsumoto, Nirasaki (JP); Akira Fujio, Nirasaki (JP); Shin Kono, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 312 days.

(21) Appl. No.: 17/593,470

(22) PCT Filed: Mar. 5, 2020

(86) PCT No.: PCT/JP2020/009360
§ 371 (c)(1),
(2) Date: Sep. 20, 2021

(87) PCT Pub. No.: WO2020/195670
PCT Pub. Date: Oct. 1, 2020

(65) Prior Publication Data
US 2022/0185673 A1 Jun. 16, 2022

(30) Foreign Application Priority Data
Mar. 25, 2019 (JP) .................... 2019-055932

(51) Int. Cl.
*C01B 32/186* (2017.01)
*G01J 4/04* (2006.01)
(Continued)

(52) U.S. Cl.
CPC .............. *C01B 32/186* (2017.08); *G01J 4/04* (2013.01); *G01N 21/21* (2013.01); *G01N 21/88* (2013.01)

(58) Field of Classification Search
CPC ...... G01N 21/88; G01N 21/21; G01N 21/211; G01N 21/8422; G01N 2021/213; C01B 32/186; G01J 4/04
See application file for complete search history.

(56) References Cited

U.S. PATENT DOCUMENTS
2016/0341792 A1* 11/2016 Malkova .............. G01N 21/211

FOREIGN PATENT DOCUMENTS
JP 2013-100205 A 5/2013
JP 2014-231455 A 12/2014

OTHER PUBLICATIONS

Masahiro Kawano et al 2016 Jpn. J. Appl. Phys. 55 06HC04 DOI 10.7567/JJAP.55.06HC04 (Year: 2016).*

(Continued)

*Primary Examiner* — Uzma Alam
*Assistant Examiner* — Jonathon Cook
(74) *Attorney, Agent, or Firm* — Armstrong Teasdale LLP

(57) ABSTRACT

A method for detecting abnormal growth of graphene includes: measuring, through spectroscopic ellipsometry, a reflection spectrum of a measurement object having a graphene film formed through CVD on a substrate; creating a film structure model, calculating polarization parameters, and matching calculated values of the polarization parameters to measured values through fitting; and detecting abnormal growth of the graphene based on a value of goodness of fit obtained when fitting the polarization parameters.

18 Claims, 10 Drawing Sheets

(51) Int. Cl.
  *G01N 21/21*  (2006.01)
  *G01N 21/88*  (2006.01)

(56) References Cited

OTHER PUBLICATIONS

M. Copel, S. Oida, A. Kasry, A. A. Bol, J. B. Hannon, R. M. Tromp; Medium energy ion scattering of Gr on SiC(0001) and Si(100). Appl. Phys. Lett. Mar. 14, 2011; 98 (11): 113103. https://doi.org/10.1063/1.3565968 (Year: 2011).*

Florence Nelson et al 2011 ECS Trans. 35 173 DOI 10.1149/1.3569909 (Year: 2011).*

Aleksandar Matković, Angela Beltaos, Marijana Milićević, Uro Ralević, Borislav Vasić, Djordje Jovanović, Rado Gajić; Spectroscopic imaging ellipsometry and Fano resonance modeling of graphene. J. Appl. Phys. Dec. 15, 2012; 112 (12): 123523. https://doi.org/10.1063/1.4771875 (Year: 2012).*

* cited by examiner

Film forming time: 5 minutes

Film forming time: 15 minutes

Film forming time: 20 minutes

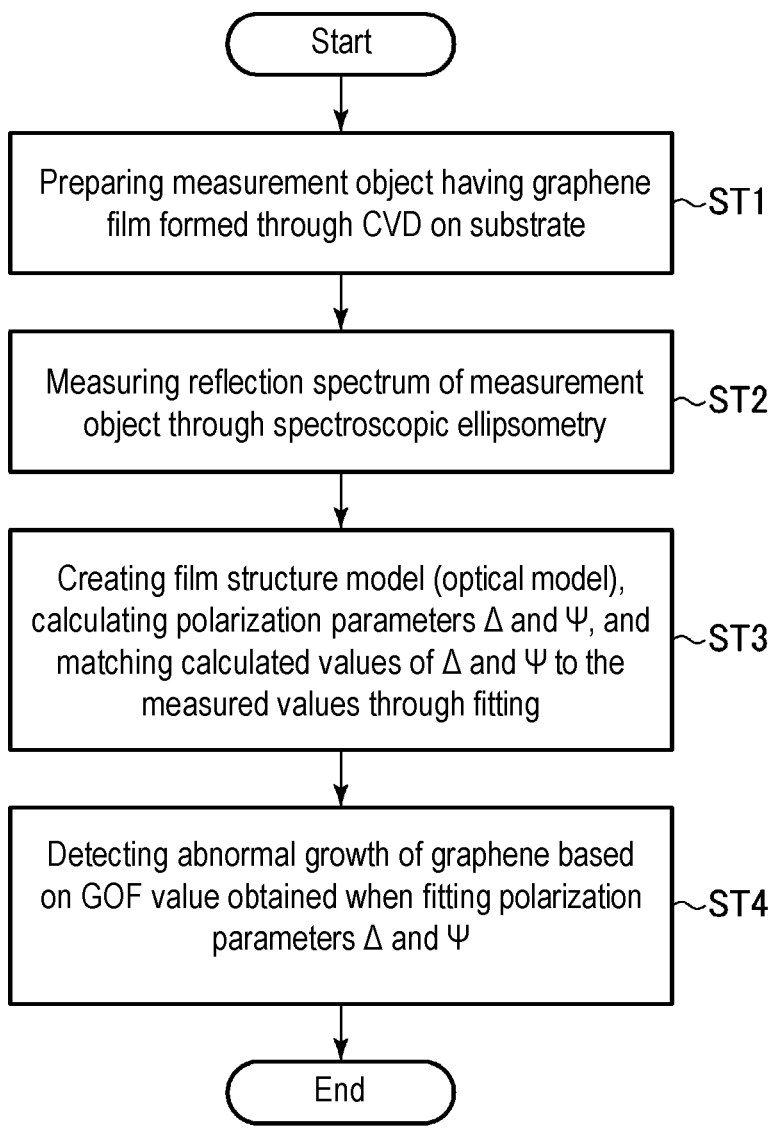

Result of fitting n, Wavelength

Result of fitting k, Wavelength

FIG. 11
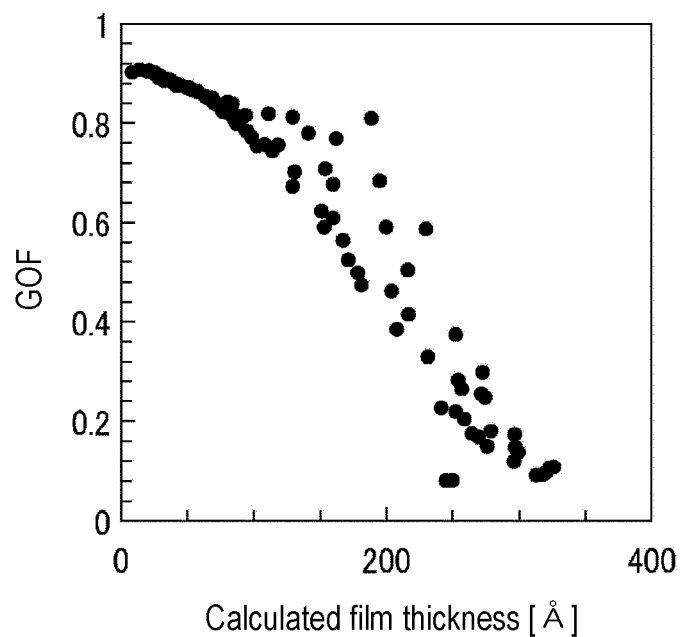
FIG. 12
A 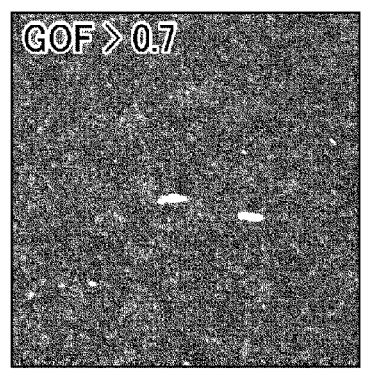   B 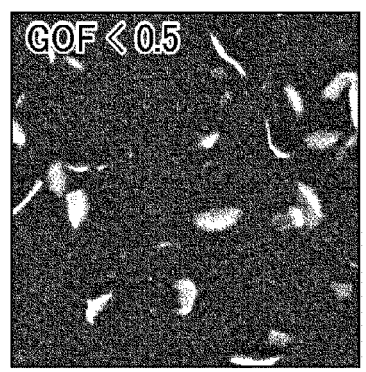

METHOD FOR DETECTING ABNORMAL GROWTH OF GRAPHENE, MEASUREMENT APPARATUS, AND FILM FORMATION SYSTEM

CROSS-REFERENCE TO RELATED APPLICATIONS

This application is a National Stage Application of International Patent Application No. PCT/JP2020/009360, having an International Filing Date of Mar. 5, 2020, which claims the benefit of priority to Japanese Patent Application No. 2019-055932, filed Mar. 25, 2019, each of which is hereby incorporated by reference herein.

TECHNICAL FIELD

The present disclosure relates to a method for detecting abnormal growth of graphene, a measurement apparatus and a film formation system.

BACKGROUND

Graphene is a two-dimensional crystal formed on a substrate parallel to the substrate by forming a thin film of graphite having one to several tens or several hundred atomic layers on the substrate.

Graphene is configured as an aggregate of six-membered ring structures by covalent bonds ($sp^2$-bonds) of carbon atoms, and exhibits unique electronic properties, such as a mobility of 200,000 $cm^2$/Vs or more, which is 100 times or more than that of silicon (Si), and a current density of $10^9$ $A/cm^2$, which is 1000 times or more than that of Cu.

Due to these characteristics, graphene is attracting attention as a material for various devices, such as wiring, field effect transistor (FET) channels, and barrier films.

As a method for forming graphene, a method in which a catalyst metal layer is formed on an object to be processed, the catalyst metal layer is activated, and graphene is then formed through CVD has been proposed. In an embodiment, CVD using microwave plasma is described as an example of CVD (Patent Documents 1 and 2).

Graphene usually grows two-dimensionally when formed through CVD. However, it is known that abnormal growth called a carbon nanowall (CNW) having a component perpendicular to the substrate over one or several layers of single-layer graphene (graphene sheet) may occur.

PRIOR ART DOCUMENTS

Patent Documents

Patent Document 1: Japanese Laid-Open Patent Publication No. 2013-100205
Patent Document 2: Japanese Laid-Open Patent Publication No. 2014-231455

The present disclosure provides a method and measurement apparatus for detecting abnormal growth of graphene formed through CVD and a film formation system.

SUMMARY

A method according to an aspect of the present disclosure relates to a method for detecting abnormal growth of graphene. The method includes: measuring, through spectroscopic ellipsometry, a reflection spectrum of a measurement object having a graphene film formed through CVD on a substrate; creating a film structure model, calculating polarization parameters, and matching calculated values of the polarization parameters to measured values through fitting; and detecting abnormal growth of the graphene on the basis of a value of goodness of fit obtained when fitting the polarization parameters.

According to the present disclosure, a method and measurement apparatus for detecting abnormal growth of graphene formed through CVD and a system for forming a graphene film are provided.

BRIEF DESCRIPTION OF DRAWINGS

FIG. 3 is a flowchart illustrating a method for detecting abnormal growth of graphene according to an embodiment.
FIG. 11 is a view showing a relationship between calculated film thicknesses of graphene films and GOF values of polarization parameters.
FIG. 12 is a view illustrating SEM images of graphene films when GOF>0.7 and when GOF<0.5.

DETAILED DESCRIPTION

Hereinafter, embodiments will be described in detail with reference to the accompanying drawings.

First, a description will be given on history.

When forming a graphene film through CVD, the graphene film is usually grown two-dimensionally parallel to the substrate. However, as described above, abnormal growth called a carbon nanowall (CNW) or vertically grown graphene (VGG) having a component perpendicular to the substrate may occur. The CNW (VGG) is an ultrathin film (several nm) sheet similar to graphene, and the amount thereof tends to increase as the film forming time increases.

Figure 1A:
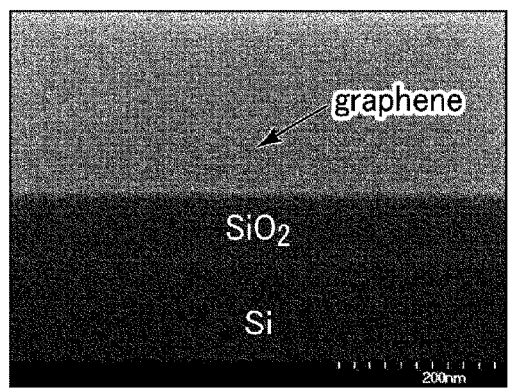
FIG. 1A is an SEM photograph of a graphene film (deposition time: 5 minutes) formed through plasma CVD.
Figure 1B:
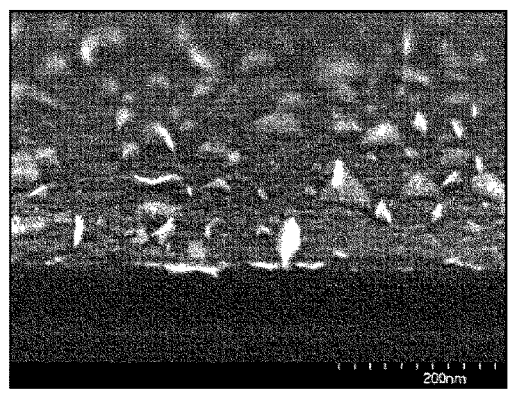
FIG. 1B is an SEM photograph of a graphene film (deposition time: 15 minutes) formed through plasma CVD.
Figure 1C:
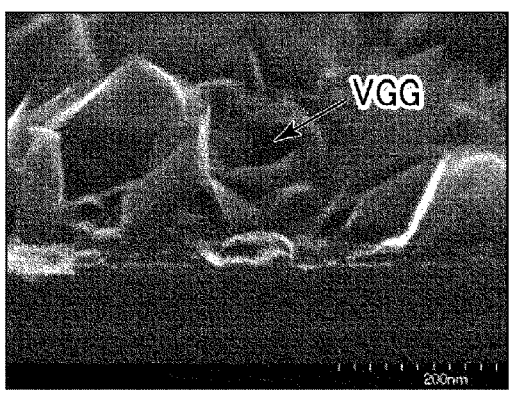
FIG. 1C is an SEM photograph of a graphene film (deposition time: 20 minutes) formed through plasma CVD.

FIGS. 1A to 1C are SEM photographs of graphene films formed through plasma CVD, and the film forming times thereof were 5 minutes, 15 minutes, and 20 minutes, respectively. From these SEM photographs, it can be seen that when the film forming time was 5 minutes, there is only graphene that is almost parallel to the substrate, when the film forming time was 15 minutes, VGG, which is abnormal growth, began to crystallize, and when the film forming time was 20 minutes, abnormal growth mode was dominant.

Figure 2A:
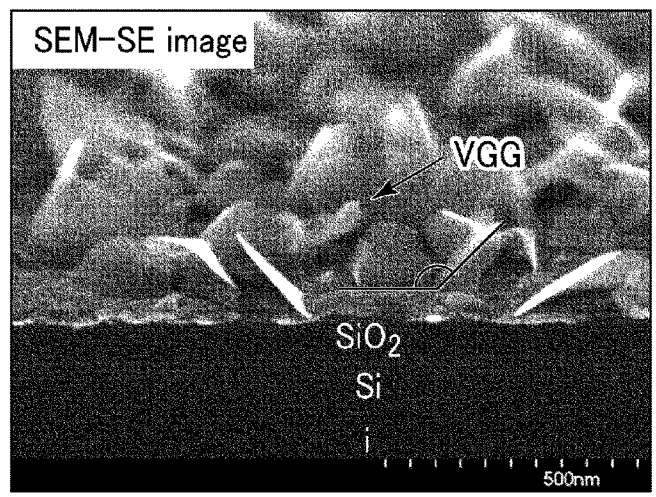
FIG. 2A is an SEM image of a graphene film having VGG.
Figure 2B:
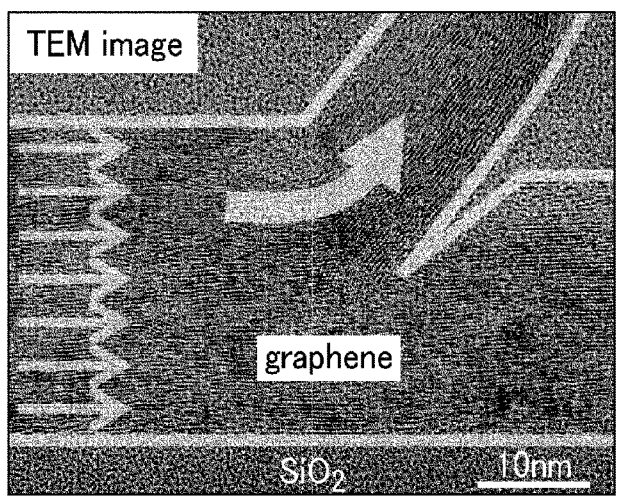
FIG. 2B is a TEM image of a portion in which the VGG is crystallized in FIG. 2A.

In addition, FIG. 2A is an SEM image of a graphene film having VGG, FIG. 2B is a TEM image of the portion in which the VGG is crystallized in FIG. 2A. From FIG. 2B, VGG is considered as having slipped out from line defects contained within graphene crystals or the like. It is presumed that one of the causes of such abnormal growth is that, when graphene crystals grow from a plurality of locations in the plane of a substrate, the grown graphene crystal grains collide with each other and ride up.

Considering the application of graphene to semiconductors, it is necessary to have a technique to detect a location where CNW (VGG), which is an abnormally growing crystal, grows. CNW (VGG) has a special shape of a two-dimensional crystal having an atomic layer thickness due to the film formation principle thereof, and in the related art, a method for detecting the same has not been reported so far.

In contrast, in the present embodiment, it has been found that it is possible to detect abnormal growth such as CNW (VGG) simultaneously with measuring a film thickness using spectroscopic ellipsometry.

Details will be described below.

FIG. 3 is a flowchart illustrating a method for detecting abnormal growth of graphene according to an embodiment.

The method according to the present embodiment includes step ST1, step ST2, step ST3, and step ST4.

Figure 4:
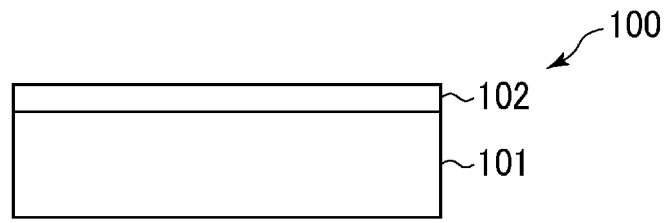
FIG. 4 is a cross-sectional view illustrating an exemplary measurement object used in a method for detecting abnormal growth of graphene according to an embodiment.

Step ST1 is a step of preparing a measurement object having a graphene film formed through CVD on a substrate. As illustrated in FIG. 4, the measurement object 100 has a graphene film 102 formed through CVD on an appropriate substrate 101. The substrate 101 is not particularly limited, and may be a semiconductor, an insulator, or a metal. A catalytic metal layer that promotes the growth of graphene, such as Ni, may be formed on the surface of the substrate 101.

Figure 5A:
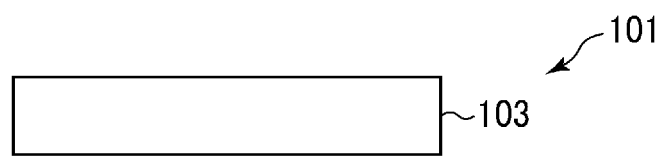
FIG. 5A is a cross-sectional view illustrating an exemplary structure of a substrate used as a measurement object.
Figure 5B:
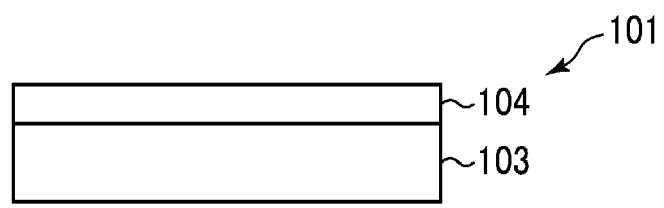
FIG. 5B is a cross-sectional view illustrating another exemplary structure of a substrate used as a measurement object.
Figure 5C:
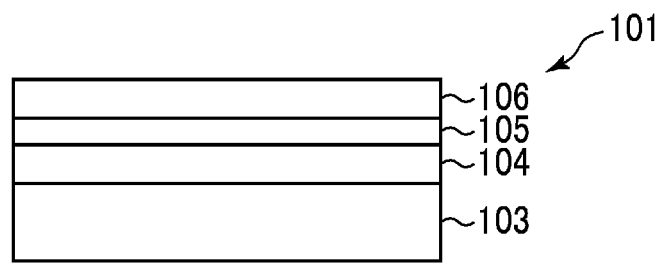
FIG. 5C is a cross-sectional view illustrating still another exemplary structure of a substrate used as a measurement object.

Specific examples of the substrate 101 are illustrated in FIGS. 5A to 5C. The substrate 101 may be a semiconductor wafer. In the example of FIG. 5A, the substrate 101 is composed only of a semiconductor base body 103, such as silicon. In the example of FIG. 5B, in the substrate 101, an insulating film 104, such as a SiO$_2$ film, is formed on the semiconductor base body 103. In the example of FIG. 5C, in the substrate 101, a metal film 106, such as a Cu film, is formed on the semiconductor base body 103 via an insulating film 104 and a barrier film 105, such as a TaN film, a Ta film, or a TiN film. The barrier film 105 may be omitted depending on the metal. In addition, the barrier film 105 may be a laminated film (e.g., Ta/TaN).

The graphene film 102 may be formed through CVD, which may be thermal CVD or plasma CVD, but plasma CVD is preferable from the viewpoint of forming a graphene film having good crystallinity. The plasma at this time is not particularly limited, but it is preferable to use microwave plasma, particularly remote microwave plasma. The remote microwave plasma refers to plasma that is generated by microwave electric fields by introducing microwaves into a processing container and diffused from a plasma-generating region to act on a base body that is disposed at a location spaced apart from the plasma-generating region. By using the remote microwave plasma, it is possible to dissociate a carbon-containing gas into a state suitable for growing graphene at a relatively low temperature.

When forming a graphene film through CVD, a gas containing a carbon-containing gas is used as a processing gas. As the carbon-containing gas, for example, a hydrocarbon gas, such as ethylene ($C_2H_4$), methane ($CH_4$), ethane ($C_2H_6$), propane ($C_3H_8$), propylene ($C_3H_6$), or acetylene ($C_2H_2$), or an alcohol gas, such as methanol ($CH_3OH$) or ethanol ($C_2H_5OH$), may be used. Other gases containing a carbon-containing gas may include rare gases such as Ar, He, Ne, Kr, and Xe, or may include hydrogen gas ($H_2$ gas), oxygen gas ($O_2$), or the like in order to improve the crystallinity of graphene.

In step ST2, the reflection spectrum of a measurement object is measured through spectroscopic ellipsometry. Ellipsometry is an optical measurement method using polarized light, and in spectroscopic ellipsometry, the amount of change in polarized light between incident light and reflected light is measured for each wavelength.

In step ST3, a film structure model (an optical model) is created, polarization parameters $\Delta$ and $\Psi$ are calculated, and the calculated values of $\Delta$ and $\Psi$ are matched to the measured values through fitting.

In step ST4, abnormal growth of graphene is detected on the basis of a GOF value obtained when fitting the polarization parameters $\Delta$ and $\Psi$.

Figure 6:
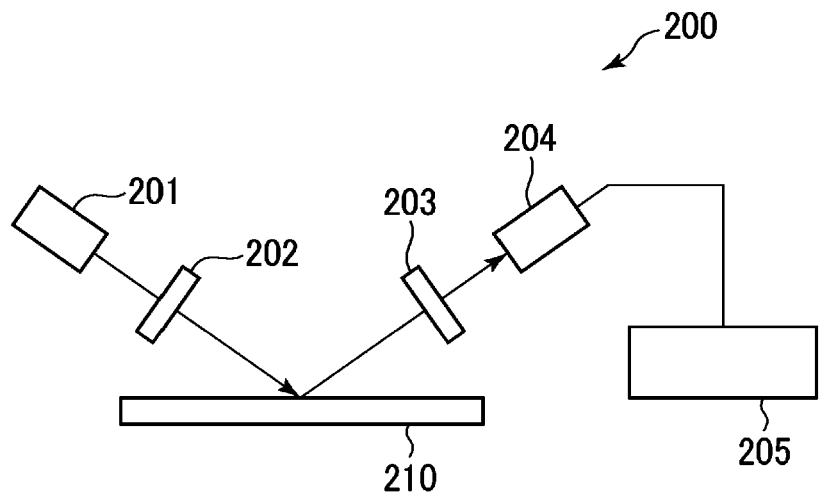
FIG. 6 is a schematic view illustrating an exemplary spectroscopic ellipsometry measurement apparatus used in a method for detecting abnormal growth of graphene according to an embodiment.

FIG. 6 is a schematic view illustrating a spectroscopic ellipsometry measurement apparatus capable of detecting abnormal growth of graphene. As illustrated in FIG. 6, the measurement apparatus 200 includes a light source 201, a polarizer 202, an analyzer 203, a measurement part 204, and an arithmetic part 205. The light emitted from the light source 201 is turned into polarized light by the polarizer 202, and is incident on a measurement object 210 having a graphene film formed on the substrate. The incident light is reflected from the surface of the measurement object 210 and the interface between the graphene film and a base of the same, and the reflected light reaches the measurement part 204 via the analyzer 203. The measurement part 204 measures the reflection spectrum of the measurement object. The measurement result of the measurement part 204 is provided to the arithmetic part 205, and predetermined arithmetic operation is performed. The incident light is linearly polarized light in which the amplitudes and phases of the p-polarized light component and the s-polarized light component are matched. However, the light reflected from the surface of the measurement object and the light reflected from the interface interfere with each other, and the speed of the light passing through the film slows down according to the refractive index. Thus, phases are also deviated. Since the amplitudes and phases of the components parallel to the incident surface (p-polarized light) and the component perpendicular to the incident surface (s-polarized light) are different, the reflected light is turned into elliptically polarized light, the polarized state being different from that at the time of incidence.

Figure 7:
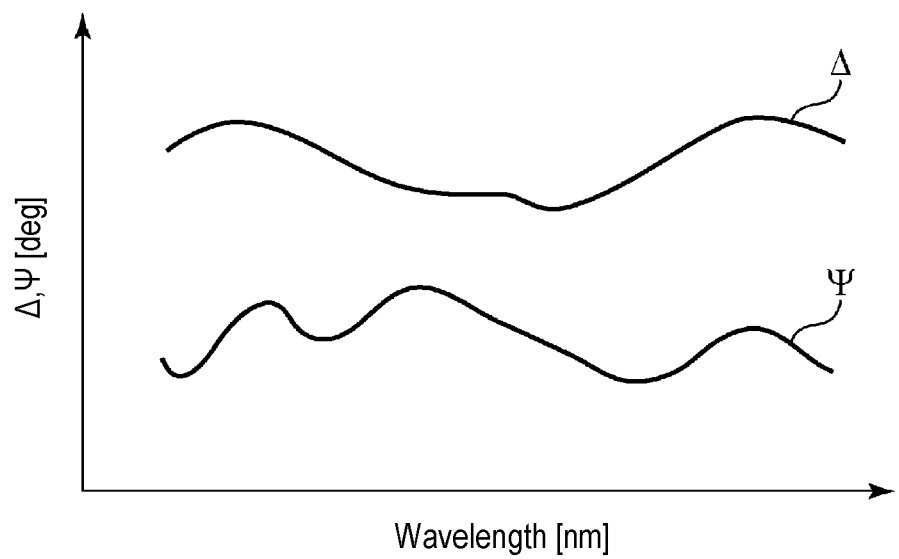
FIG. 7 is a view schematically showing measured values of polarization parameters $\Delta$ and $\Psi$ measured through spectroscopic ellipsometry.

Therefore, in the spectroscopic ellipsometry of step ST2, this change in the polarization state is measured. Polarization parameters Δ and Ψ are used as measurement data. Δ is the phase difference between s-polarized light and p-polarized light, and Ψ is the amplitude ratio between s-polarized light and p-polarized light. Specifically, the measured values of Δ and Ψ are obtained for wave, for example, as shown in FIG. 7. FIG. 7 merely schematically show measured values, which differ from actually measured values.

In step ST3 described above, when the calculated values of Δ and Ψ are matched to measured values through fitting, Δ and Ψ are calculated using the refractive index n, the extinction coefficient k, and the film thickness t as variables. Thus, fitting is performed using the n, k, and t of a film structure model as parameters. Specifically, a film structure model is created assuming that there is no abnormal growth, and Δ and Ψ are simulated to obtain calculated values. Thereafter, the measured values of Δ and Ψ are compared with the calculated values, and the film structure model is updated such that the difference therebetween becomes small. The update of the film structure model is repeated until it is determined that the comparison result between the measured values and the calculated values of Δ and Ψ has converged on the basis of a predetermined determination condition. The condition for determining convergence may be when a goodness of fit (GOF) obtained when fitting the polarization parameters Δ and Ψ is closest to 1. At that time, n, k, and t are determined as the values of an actual sample. The GOF is an index showing how close the values calculated using a model are to the measured values, and indicates a value of 0 to 1, and the closer to 1, the smaller the deviation from the measured value. The calculation of step ST3 is performed by the arithmetic part 205. In updating the film structure model, among the refractive index n, the extinction coefficient k, and the film thickness t, n and k may be experimentally obtained values, and only t may be used as a parameter.

Figure 8A:
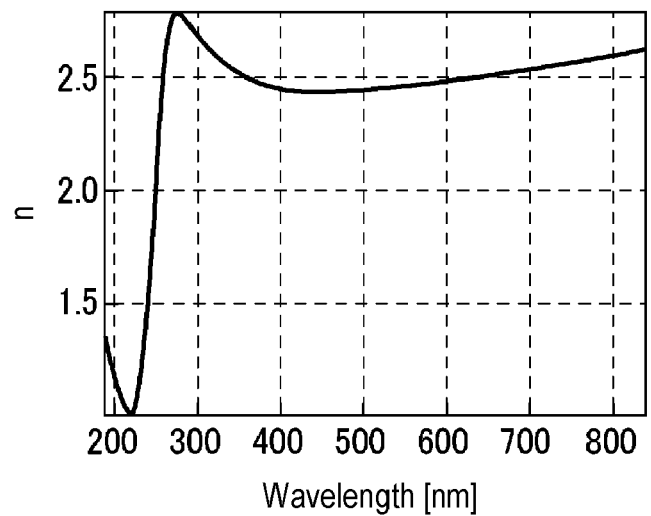
FIG. 8A is a view showing a result of fitting a refractive index n.
Figure 8B:
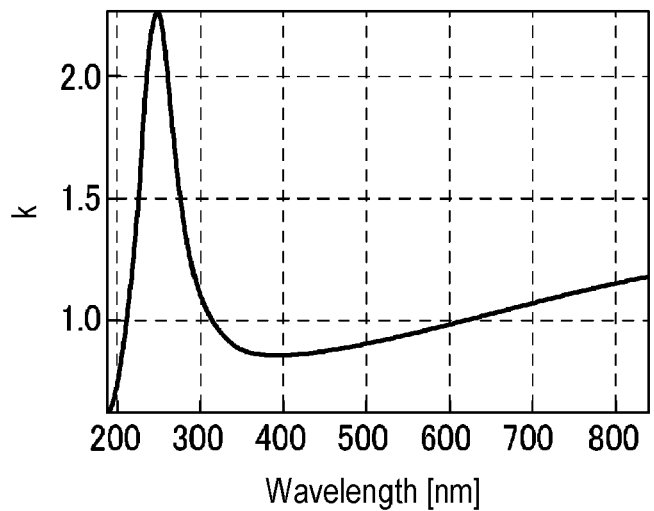
FIG. 8B is a view showing a result of fitting an extinction coefficient k.
Figure 9:
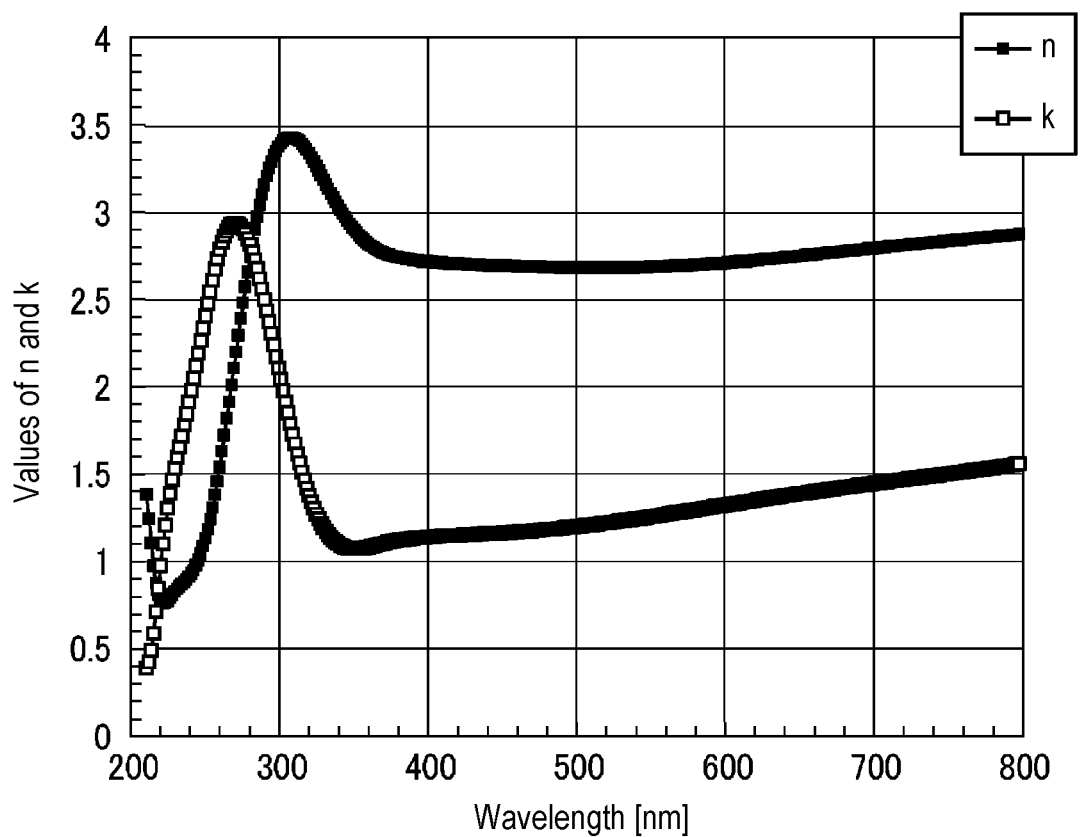
FIG. 9 is a view showing literature (experimental) values of a refractive index n and an extinction coefficient k.

The film thickness of the graphene may be calculated through fitting in step ST3. For example, FIGS. 8A and 8B show the results of fitting n and k with respect to a measurement object formed by forming a $SiO_2$ film on a silicon substrate and forming a graphene film on the $SiO_2$ film. This fitting results show the same tendency as the literature (experimental) values shown in FIG. 9, and it is possible to obtain the film thickness of graphene from these fitting results.

If a GOF value obtained when fitting Δ and Ψ is low, it indicates that the fitting is not possible with the assumed optical constants and film structure. That is, it shows that the optical constants deviate from those of an ideal graphene film. Meanwhile, the ideal graphene film grows two-dimensionally parallel to the substrate, whereas the abnormally grown crystal CNW (VGG) has a component perpendicular to the substrate. Thus, abnormal growth can be regarded as the deviation of optical constants from those of the ideal graphene film. Therefore, in step ST4, it is possible to detect abnormal growth of graphene from a GOF value, which is an index of degree of deviation.

In the case of graphene with almost no abnormal growth, the GOF values obtained when fitting the polarization parameters Δ and Ψ are approximately 0.8 or more. Therefore, when the GOF values obtained when fitting the polarization parameters Δ and Ψ are less than 0.8, it may be considered that abnormal growth exists in the graphene film. The detection of abnormal growth in step ST4 is performed by calculating the GOF values using the arithmetic part 205 and determining whether or not the GOF values are less than 0.8.

At this time, when the relationship between the amount of abnormal growth and the GOF values obtained when fitting the polarization parameters Δ and Ψ is obtained in advance, it is also possible to quantitatively detect abnormal growth. In addition, it is possible to set the threshold of the GOF values obtained when fitting the polarization parameters Δ and Ψ, and when the GOF values obtained when fitting the Δ and Ψ become equal to or less than the threshold, it is possible to confirm the actual occurrence state of abnormal growth using SEM photographs or the like.

Measuring the film thickness of graphene using ellipsometry has been conventionally performed (e.g., Japanese Patent Laid-Open Publication No. 2016-88766). In the present embodiment, in step ST3, it is also possible to measure the thickness of a graphene film in the same manner as in the conventional case.

However, in the present embodiment, without being limited to the measurement of the thickness of the graphene film through spectroscopic ellipsometry, the abnormal growth of graphene is also detected by using GOF values obtained when fitting the polarization parameters Δ and Ψ at the time of fitting in spectroscopic ellipsometry.

By using GOF values obtained when fitting the polarization parameters Δ and Ψ in this way, it is possible to easily detect the abnormal growth of graphene, for which there was no conventional detection method has existed.

Next, the result of actually detecting the abnormal growth of graphene using the method of the present embodiment will be described.

Figure 10:
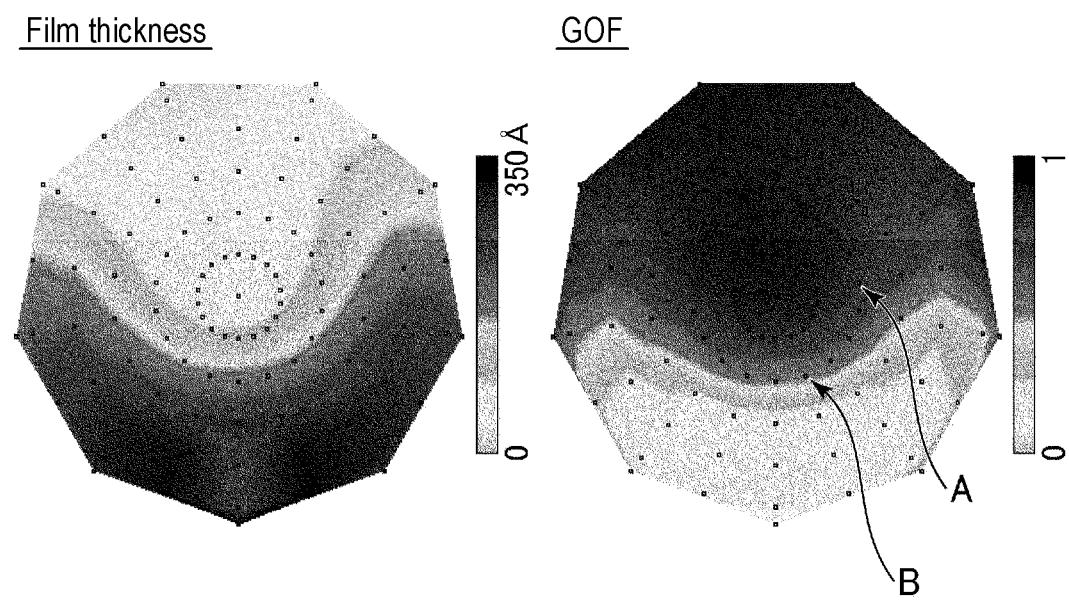
FIG. 10 is a view showing a distribution of film thicknesses calculated by measuring a reflection spectrum of a graphene film through spectroscopic ellipsometry and performing fitting, and a distribution of GOF values of polarization parameters obtained at that time.

Here, first, a graphene film was formed on a substrate through remote microwave plasma CVD while imparting a film thickness distribution on purpose. The reflection spectrum of this graphene film was measured through spectroscopic ellipsometry, and fitting was performed to calculate the film thickness. In addition, the GOF values of Δ and Ψ, which are polarization parameters at that time, were obtained. FIG. 10 shows a distribution of film thicknesses obtained by calculation and the distribution of GOF values obtained when fitting the polarization parameters Δ and Ψ. In addition, FIG. 11 illustrates a graph of the results of FIG. 10 as the relationship between the calculated film thicknesses and the GOF values.

As shown in FIGS. 10 and 11, it can be seen that GOF values decrease as the calculated film thicknesses increase. As described above, it is shown that, in the part in which GOF values are low, fitting is impossible with the assumed optical constants/film structure, suggesting that optical constants are deviated from those of the ideal graphene.

Therefore, SEM images of position A (GOF>0.7) and position B (GOF<0.5) in the GOF distribution of FIG. 10 were taken. The SEM images of positions A and B are shown in FIG. 12. It was confirmed that the density of abnormal growth was actually high at position B where GOF values were low. From this result, it was confirmed that it is possible to detect the abnormal growth of graphene using the GOF values obtained when fitting the polarization parameters Δ and Ψ.

Next, a film formation system incorporating the measurement apparatus illustrated in FIG. 6 will be described.

Figure 13:
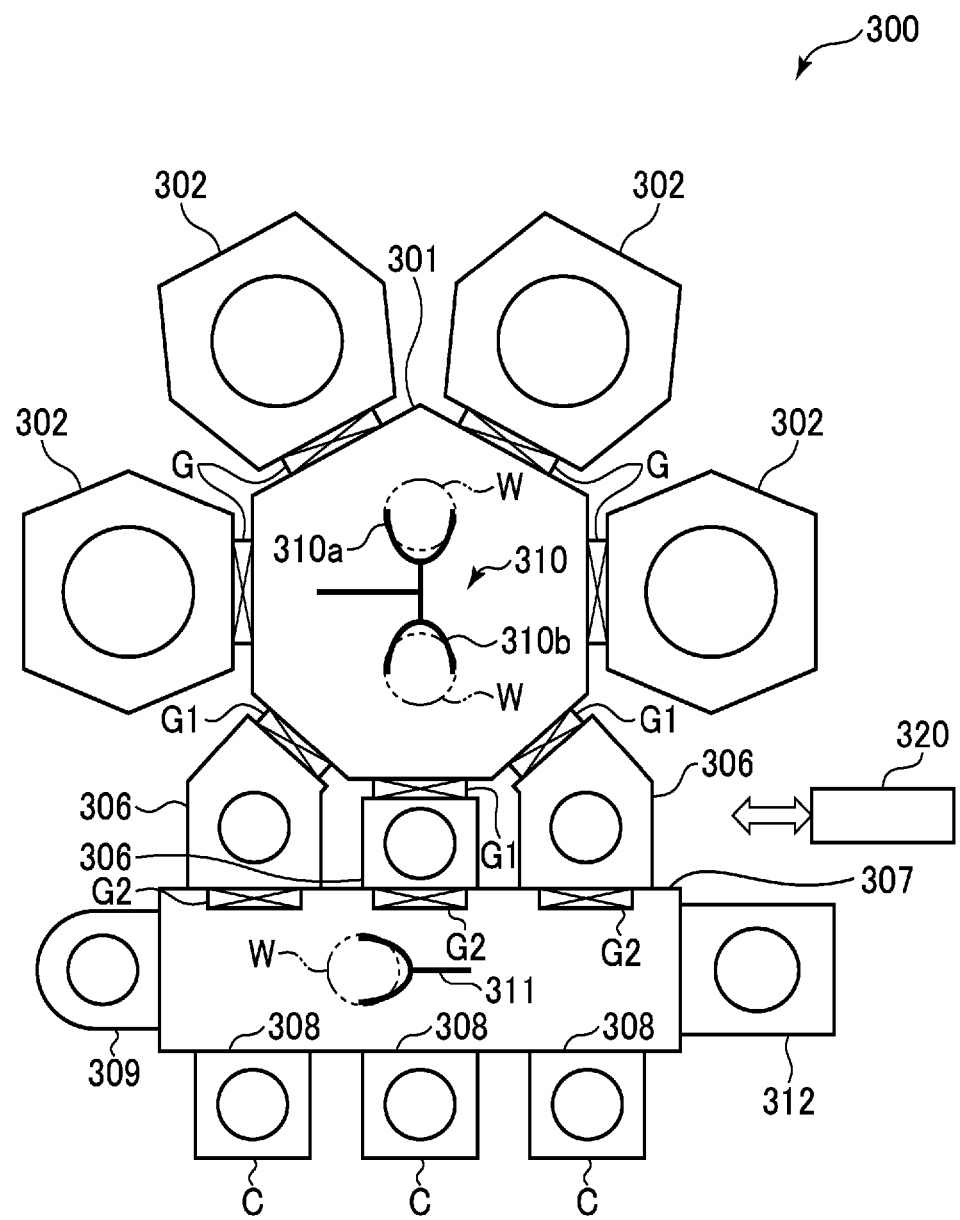
FIG. 13 is a horizontal cross-sectional view schematically illustrating an exemplary film formation system equipped with a measurement apparatus.

FIG. 13 is a horizontal cross-sectional view schematically illustrating an example of such a film formation system. As illustrated in FIG. 13, the film formation system 300 of this example is a multi-chamber-type system having a plurality of graphene film forming apparatuses, and forms a graphene film on a substrate W, such as a semiconductor wafer.

The film formation system 300 includes a vacuum transport chamber 301, and four graphene film forming apparatuses 302 are connected to the vacuum transport chamber 301 via respective gate valves G. The number of film forming apparatuses 302 connected to the vacuum transport chamber 301 is not limited to four.

Each film forming apparatus 302 for forming a graphene film includes a processing container configured to accommodate therein a substrate W, a gas supply mechanism configured to supply a processing gas into the processing container, and a vacuum exhaust mechanism configured to evacuate the inside of the processing container and maintaining the inside of the processing container in a set vacuum state. In addition to these, the film forming apparatus 302 also includes a heating mechanism configured to heat the substrate W and a plasma forming mechanism in the case of plasma CVD. Then, a substrate is placed on the stage in the processing container, the pressure in the processing container and the temperature of the substrate are set to desired values, and the processing gas is supplied into the processing container while forming plasma as necessary. Then, a graphene film is formed on the substrate W through thermal CVD or plasma CVD.

Three load-lock chambers 306 are connected to the vacuum transport chamber 301 via respective gate valves G1. The number of load-lock chambers 306 is also not limited.

An atmospheric transport chamber 307 is provided on the side opposite of the vacuum transport chamber 301 with the load-lock chambers 306 interposed therebetween. The three load-lock chambers 306 are connected to the atmospheric transport chamber 307 via respective gate valves G2. Each load-lock chamber 306 performs pressure control between atmospheric pressure and vacuum when a substrate W is transported between the atmospheric transport chamber 307 and the vacuum transport chamber 301. The atmospheric transport chamber 307 is configured to form a downflow of clean air therein.

The wall of the atmospheric transport chamber 307 opposite the wall, on which the load-lock chambers 306 are mounted, includes three carrier-mounting ports 308 in each of which a carrier C, such as a FOUP, is configured to accommodate therein a plurality of substrates W. In addition, on one side wall of the atmospheric transport chamber 307, an alignment chamber 309 is provided to perform alignment of a substrate W.

A measurement apparatus 312 having a configuration similar to that of the measurement apparatus 200 of FIG. 6 is connected to the other side wall of the atmospheric transport chamber 307. The measurement apparatus 312 detects abnormal growth of a formed graphene film. The measurement apparatus 312 is also able to measure the thickness of the graphene film.

In the vacuum transport chamber 301, a first transport mechanism 310 is provided. The first transport mechanism 310 transports substrates W to four film forming apparatuses 302. The first transport mechanism 310 has two independently movable transport arms 310a and 310b.

A second transport mechanism 311 is provided in the atmospheric transport chamber 307. The second transport mechanism 311 is configured to transport substrates W to the carriers C, the load-lock chambers 306, the alignment chamber 309, and the measurement apparatus 312.

The film-forming system 300 has an overall controller 320. The overall controller 320 controls each component of the film forming apparatus 302, and also controls the exhaust mechanism and the first transport mechanism 310 of the vacuum transport chamber 301, the second transport mechanism 311, the exhaust mechanism and the gas supply mechanism of the load-lock chamber 306, the drive system of the gate valves G, G1 and G2, and the like. In addition, the overall controller 320 causes the film formation system 300 to execute a predetermined operation on the basis of a processing recipe stored in a storage medium.

In the film formation system 300, a carrier C accommodating a predetermined number of substrates W, such as semiconductor wafers, is connected to a carrier mounting port 308 of the atmospheric transport chamber 307 so as to start film formation.

First, the substrates W are taken out from the carrier C by the second transport mechanism 311, aligned in the alignment chamber 309, and then transported to any of the load-lock chambers 306. Then, in the state in which the load-lock chamber 306 is evacuated, a substrate in the load-lock chamber 306 is transported to any of the film forming apparatuses 302 by the first transport mechanism 310, and a graphene film is formed on the substrate by the film forming apparatus 302. In parallel with the film forming process, the substrates W in the carrier C are similarly transported to another film forming apparatus 302 by the second transport mechanism 311 and the first transport mechanism 310. In the film forming apparatus 302 in which the film forming process is completed, the processed substrate W is taken out by the first transport mechanism 310 and transported to any of the load-lock chambers 306. Then, after returning the load-lock chamber 306 to the atmospheric atmosphere, the substrate W is transported to the measurement apparatus 312 by the second transport mechanism 311, and the abnormal growth of graphene or the like after film formation is detected. Thereafter, the substrate W is returned from the measurement apparatus 312 to the carrier C by the second transport mechanism 311.

The processes described above are performed simultaneously for a plurality of substrates W, and a series of processes is completed for the number of substrates W mounted in the carrier C.

As described above, since the film formation system 300 includes the measurement apparatus 312, it is possible to detect the abnormal growth of graphene or the like immediately after forming a graphene film. In addition, it is easy to reflect the results of detection of the measurement apparatus 312 to the film forming conditions of a graphene film.

The installation location of the measurement apparatus 312 is not limited to the example of FIG. 13, and may be another location. For example, one of the film forming apparatuses 302 connected to the vacuum transport chamber 301 may be replaced with a measurement apparatus. In addition, the measurement apparatus may be provided in each film forming apparatus 302. In this case, it is possible to form a graphene film while performing monitoring by the measurement apparatus. Specifically, it is possible to detect abnormal growth by measuring the reflection spectrum of the measurement object during the formation of a graphene film.

Although embodiments have been described above, it should be considered that the embodiments disclosed herein are illustrative and are not restrictive in all respects. The embodiments described above may be omitted, replaced, or modified in various forms without departing from the scope and spirit of the appended claims.

For example, as a substrate used as a measurement object having a graphene film, a semiconductor wafer having a semiconductor such as Si as a base, has been described as an example, but the present disclosure is not limited thereto. In addition, the film formation system of FIG. 13 is merely an example, and may be a film formation system having various other configurations.

EXPLANATION OF REFERENCE NUMERALS 100, 210: measurement object, 101: substrate, 102: graphene film, 200, 312: measurement apparatus, 201: light source, 202: polarizer, 203: analyzer, 204: measurement part, 205: arithmetic part, 300: film formation system, 302: film forming apparatus

What is claimed is:

1. A method for detecting abnormal growth of graphene, the method comprising:
   measuring, through spectroscopic ellipsometry, a reflection spectrum of a measurement object having a graphene film formed through CVD on a substrate;
   creating a film structure model, calculating polarization parameters, and matching calculated values of the polarization parameters to measured values through fitting; and
   detecting abnormal growth of the graphene based on a value of goodness of fit obtained when fitting the polarization parameters,
   wherein the film structure model is created assuming that there is no abnormal growth, and then updated such that a difference between the measured values and the calculated values becomes smaller.

2. The method of claim 1, wherein the abnormal growth includes a carbon nanowall grown from the graphene film so as to include a vertical component.

3. The method of claim 1, wherein, as the polarization parameters, a phase difference $\Delta$ between s-polarized light and p-polarized light and/or an amplitude ratio $\Psi$ between the s-polarized light and the p-polarized light are used.

4. The method of claim 1, wherein the matching the calculated values of the polarization parameters to the measured values through the fitting is performed using a refractive index n, an extinction coefficient k, and a film thickness t of the film structure model as parameters.

5. The method of claim 1, wherein a thickness of the graphene film is calculated by matching the calculated values of the polarization parameters to the measured values through the fitting.

6. The method of claim 1, wherein it is determined that the abnormal growth is present when the goodness of fit is less than 0.8 when detecting the abnormal growth of the graphene based on the value of the goodness of fit of the polarization parameters obtained when fitting.

7. The method of claim 1, wherein, when detecting the abnormal growth of the graphene based on the value of the goodness of fit of the polarization parameters obtained when fitting, a relationship between an amount of the abnormal growth and the value of the goodness of fit of the polarization parameters is obtained in advance, and the abnormal growth is quantitatively detected.

8. The method of claim 1, wherein the measuring the reflection spectrum of the measurement object is performed during formation of the graphene film through the CVD.

9. A measurement apparatus comprising:
   a light source configured to emit light to a measurement object including a graphene film formed through CVD on a substrate;
   a polarizer configured to turn the light emitted from the light source into polarized light;
   an analyzer configured to allow reflected light reflected from the measurement object to pass therethrough;
   a measurement part configured to measure a reflection spectrum of the measurement object from the light that has passed through the analyzer; and
   an arithmetic part configured to perform arithmetic operation based on a result of measurement of the measurement part,
   wherein the arithmetic part is configured to perform:
   creating a film structure model, calculating polarization parameters, and matching calculated values of the polarization parameters to measured values through fitting; and
   detecting abnormal growth of the graphene based on a value of goodness of fit obtained when fitting the polarization parameters, and
   wherein the film structure model is created assuming that there is no abnormal growth, and then updated such that a difference between the measured values and the calculated values becomes smaller.

10. The measurement apparatus of claim 9, wherein the abnormal growth includes a carbon nanowall grown from the graphene film so as to include a perpendicular component.

11. The measurement apparatus of claim 9, wherein the arithmetic part uses, as the polarization parameters, a phase difference $\Delta$ between s-polarized light and p-polarized light and/or an amplitude ratio $\Psi$ between the s-polarized light and the p-polarized light.

12. The measurement apparatus of claim 9, wherein, when matching the calculated values of the polarization parameters to the measured values through the fitting, the arithmetic part uses a refractive index n, an extinction coefficient k, and a film thickness t of the film structure model as parameters.

13. The measurement apparatus of claim 9, wherein the arithmetic part calculates a thickness of the graphene film by matching the calculated values of the polarization parameters to the measured values through the fitting.

14. The measurement apparatus of claim 9, wherein the arithmetic part determines that the abnormal growth is present when the goodness of fit is less than 0.8 when detecting the abnormal growth of the graphene based on the value of the goodness of fit of the polarization parameters obtained when fitting.

15. The measurement apparatus of claim 9, wherein, when detecting the abnormal growth of the graphene based on the value of the goodness of fit of the polarization parameters obtained when fitting, the arithmetic part obtains a relationship between an amount of the abnormal growth and the value of the goodness of fit of the polarization parameters in advance and quantitatively detects the abnormal growth.

16. A film formation system comprising:
   a film forming apparatus configured to form a graphene film through CVD on a substrate; and
   the measurement apparatus defined in claim 9.

17. The film formation system of claim 16, wherein the measurement apparatus is not included in the film forming apparatus, and
   the film formation system further comprises a transport mechanism configured to transport the substrate between the film forming apparatus and the measurement apparatus.

18. The film formation system of claim 16, wherein the measurement apparatus is included in the film forming apparatus.

* * * * *